US010216201B2

(12) United States Patent
Bodei et al.

(10) Patent No.: US 10,216,201 B2
(45) Date of Patent: Feb. 26, 2019

(54) SYSTEM AND METHOD FOR REGULATING THE PRESSURE OF A GAS

(71) Applicant: PIETRO FIORENTINI SPA, Arcugnano (VI) (IT)

(72) Inventors: Massimo Bodei, Muscoline (IT); Armando Amadini, Castel Mella (IT)

(73) Assignee: Pietro Fiorentini SPA, Arcugnano (VI) (IT)

(*) Notice: Subject to any disclaimer, the term of this patent is extended or adjusted under 35 U.S.C. 154(b) by 0 days.

(21) Appl. No.: 15/577,174

(22) PCT Filed: Jun. 23, 2016

(86) PCT No.: PCT/IB2016/053751
§ 371 (c)(1),
(2) Date: Nov. 27, 2017

(87) PCT Pub. No.: WO2016/207831
PCT Pub. Date: Dec. 29, 2016

(65) Prior Publication Data
US 2018/0181147 A1     Jun. 28, 2018

(30) Foreign Application Priority Data
Jun. 25, 2015   (IT) .................. 102015000027658

(51) Int. Cl.
*F16K 31/68*  (2006.01)
*G05D 16/04*  (2006.01)
*G05D 16/16*  (2006.01)

(52) U.S. Cl.
CPC ........... *G05D 16/04* (2013.01); *G05D 16/163* (2013.01)

(58) Field of Classification Search
CPC ........ G05D 16/04; G05D 16/163; A61F 7/12; A61M 16/0666; A61M 16/0875

(Continued)

(56) References Cited

U.S. PATENT DOCUMENTS 5,911,740 A * 6/1999 Tunkel .................. F25B 9/04
                                                    62/401
6,082,116 A * 7/2000 Tunkel .................. F28D 7/106
                                                    62/401

(Continued)

FOREIGN PATENT DOCUMENTS

CN    202484597 U   10/2012
EP      1533675 A1   5/2005

OTHER PUBLICATIONS

International Search Report and Written Opinion dated Jan. 4, 2017, issued in PCT Application No. PCT/IB2016/053751, filed Jun. 23, 2016.

*Primary Examiner* — Minh Le
(74) *Attorney, Agent, or Firm* — Workman Nydegger

(57) ABSTRACT

A pressure regulating system that is suited to regulate the pressure of a gas includes a regulating device suited to regulate the pressure of a first gas stream, provided with an inlet for the gas at a supply pressure and with an outlet for the gas at a regulated pressure that is lower than the supply pressure; a vortex tube suited to receive a gas stream through an inlet, separate it into a hot portion and a cold portion and deliver the hot and cold portions through corresponding outlets; a heat exchanger coupled with the vortex tube in order to heat the first gas stream before it flows into the regulating device; a recovery duct suited to collect a first portion of the first gas stream at a collection point located downstream of the heat exchanger and to convey it to the inlet of the vortex tube.

13 Claims, 5 Drawing Sheets

(58) Field of Classification Search
USPC .................................................. 137/488, 505
See application file for complete search history.

(56) References Cited

U.S. PATENT DOCUMENTS

| | | | |
|---|---|---|---|
| 2005/0045033 A1* | 3/2005 | Nicol | B01D 3/14 95/269 |
| 2006/0060246 A1* | 3/2006 | Schuetze | G05D 27/02 137/488 |
| 2007/0137590 A1* | 6/2007 | Vetrovec | F01N 5/02 123/25 A |
| 2008/0133110 A1* | 6/2008 | Vetrovec | F02B 29/0412 701/103 |
| 2008/0271465 A1* | 11/2008 | Mossberg | B64D 13/02 62/5 |
| 2009/0165887 A1* | 7/2009 | Casey | F17C 5/06 141/11 |
| 2009/0185592 A1* | 7/2009 | Vetrovec | H01S 5/024 372/35 |
| 2011/0056570 A1 | 3/2011 | Bayliff et al. | |
| 2011/0056571 A1* | 3/2011 | Bayliff | F17C 7/00 137/14 |
| 2011/0120677 A1* | 5/2011 | Oh | F25B 9/04 165/109.1 |
| 2013/0067905 A1* | 3/2013 | Eckert | F02G 5/00 60/508 |
| 2014/0260335 A1* | 9/2014 | Beeler | F25B 9/04 62/5 |
| 2015/0276271 A1* | 10/2015 | Uselton | F25B 1/06 62/115 |
| 2016/0158900 A1* | 6/2016 | Tunkel | B23P 15/26 29/890.035 |
| 2017/0143538 A1* | 5/2017 | Lee | A61F 7/12 |
| 2017/0167989 A1* | 6/2017 | Crosby | F15D 1/0015 |

\* cited by examiner

SYSTEM AND METHOD FOR REGULATING THE PRESSURE OF A GAS

BACKGROUND OF THE INVENTION

1. Field of the Invention

The present invention concerns a system and a method for regulating the pressure of a gas, particularly suited to be used in natural gas distribution networks.

2. Present State of the Art

It is known that in natural gas distribution networks pressure regulating devices are used which make it possible to reduce the pressure of the gas from a relatively high supply value to a lower delivery value compatible with the needs of the utilities for which the gas is intended.

In some cases there is the need to heat the regulating device in order to prevent the formation, inside the latter, of ice or solid materials in the form of nitrates which may cause malfunctions.

According to a known technique, the gas is heated before flowing into the regulating device, in such a way as to heat also the latter.

In order to heat the gas, a device is used which works according to the known Ranque-Hilsch effect and which is concisely referred to as "vortex tube" hereinafter.

A vortex tube comprises a chamber provided with an inlet through which a gas is introduced, wherein due to the above mentioned Ranque-Hilsch effect said gas, when inside the chamber, is separated into two streams, a hot stream and a cold stream, which flow out of the chamber at the level of two corresponding outlets.

According to said known technique, for example disclosed in document EP 1 533 675, the gas to be conveyed to the regulating device is forced to flow in contact with the hot wall of the vortex tube, so that it is heated For this purpose, the vortex tube is arranged inside a jacket, in such a way as to define a hollow space around the vortex tube, the gas to be heated being circulated in said hollow space.

Furthermore, the gas that feeds the vortex tube is the same and is taken from the main gas stream that flows through the regulating device.

The two hot and cold gas streams that flow out of the vortex tube are then conveyed downstream of the regulating device.

The known technique described above offers the advantage that it does not require the use of any auxiliary device, for example an electric device, to heat the regulating device and therefore is particularly suited to be used in regulating devices installed in remote places.

On the other hand, the effectiveness of said known technique in terms of heating of the regulating device is relatively limited, due to the fact that the vortex tube is fed with a portion of the main gas stream, which is relatively cold.

In the systems of the type described above, a safety valve may be provided upstream of the vortex tube and in case of failure said safety valve makes it possible to interrupt the gas stream which flows through the latter, in such a way as to avoid a dangerous pressure increase towards the users.

However, said safety valve poses the drawback that, being exposed to the same gas to which the regulating device is exposed, it can be subject to blockages due to the same reasons that can cause the blockage of the regulating device.

Consequently, the known technique described above has limits in terms of reliability that also restrict its field of application.

SUMMARY OF THE INVENTION

The present invention intends to overcome all of the drawbacks described above.

In particular, it is one object of the present invention to provide a system suited to regulate the pressure of a gas stream that, in addition to maintaining the advantages ensured by the known technique described above, makes it possible to heat more effectively the gas that flows through the regulating device and, therefore, to make the operation of the latter more reliable.

It is a further object of the present invention to provide a regulating system that is safer than the known technique described above.

The said objects are achieved by a system and a method for regulating the pressure of a gas stream that are carried out according to the independent claims.

Further characteristics and details of the invention are described in the dependent claims.

Advantageously, the more effective heating of the regulating device that can be obtained by means of the invention makes the regulating system more reliable compared to the known technique and allows it to be used in more demanding environmental conditions.

BRIEF DESCRIPTION OF THE DRAWINGS

The said objects and advantages, together with others that are described below, will be highlighted in the description of some preferred embodiments of the invention, which is provided herein by way of non-limiting example with reference to the attached tables, wherein.

DETAILED DESCRIPTION OF THE PREFERRED EMBODIMENTS

The regulating system that is the subject of the invention is suited to regulate the pressure of a gas directed to a user, preferably but not necessarily a natural gas that flows along a distribution network.

Figure 1:
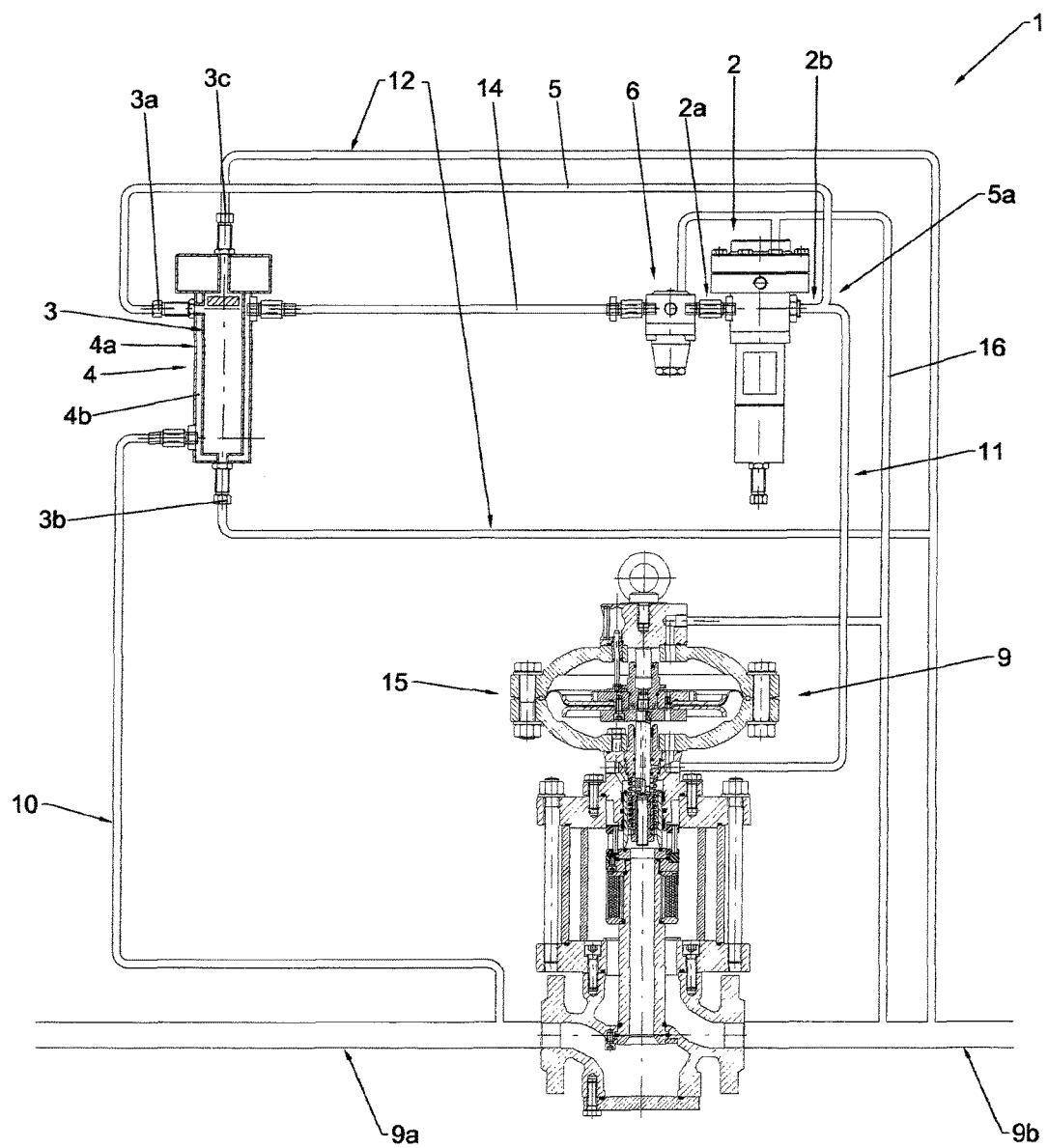
FIG. 1 shows a schematic view of the regulating system that is the subject of the invention, with some components in partial cross section.

As shown in FIG. 1, the regulating system, indicated as a whole by 1, comprises a regulating device 2 suited to regulate the pressure of a first gas stream, provided with an inlet 2a for the gas at a supply pressure and with an outlet 2b for the gas at a regulated pressure that is lower than the supply pressure.

In particular, the regulating device 2 is sensitive to the gas pressure at the user, so that it responds in order to maintain said pressure at a preset value that is linked to the regulated pressure.

Preferably but not necessarily, the regulating device 2 regulates the gas pressure through a movable shutter that is suited to define a bottleneck with variable geometry interposed between the inlet 2a and the outlet 2b, in such a way as to determine a corresponding pressure drop in the gas.

Said shutter is controlled by a membrane that is exposed to the gas directed to the user, which is conveyed to the regulating device 2 preferably through a duct 16.

In this way, any deviations of the pressure at the user with respect to the preset value are transformed into corresponding movements of the membrane and, therefore, of the shutter of the regulating device 2, wherein said movements regulate the pressure of the gas delivered by the regulating device 2 in such a way as to restore the pressure of the gas at the user.

Preferably but not necessarily, the gas flowing out of the regulating device 2 is used to pilot a pressure regulator 9, as is described in greater detail below. The regulating system 1 comprises also a heating system suited to heat the regulating device 2.

Said heating system comprises a vortex tube 3, a sectional view of which is shown in FIG. 1, configured in such a way as to receive a gas stream through an inlet 3a, separate it into a hot portion and a cold portion thanks to the Ranque-Hilsch effect and deliver said hot and cold portions through corresponding outlets 3b and 3c.

The regulating system 1 comprises also a heat exchanger 4 coupled with said vortex tube 3 in order to heat the first gas stream before it enters the regulating device 2.

The hot gas is conveyed to the regulating device 2 through a connection duct 14, in such a way as to heat it and thus avoid the formation of ice already mentioned above.

The use of a heat exchanger 4 to heat the regulating device 2, instead of using directly the hot gas that flows out of the vortex tube 3, makes it possible to set the flow rate and the pressure of the first gas stream independently of the gas that feeds the vortex tube 3, adapting it to the requirements of the regulating device 2.

Preferably but not necessarily, the heat exchanger 4 comprises a jacket 4a containing the vortex tube 3, in such a way as to delimit a hollow space 4b for the passage of the first gas stream around the vortex tube 3 itself.

More precisely, the hollow space 4b is delimited between the jacket 4a and the hot external surface of the vortex tube 3, in such a way that the gas flowing in the hollow space comes into contact with said hot external surface and is heated in its turn.

Obviously, variant embodiments of the invention not represented herein may include a heat exchanger 4 in any shape different from the one described above, provided that it includes a duct for the gas stream arranged in thermal contact with the hot external surface of the vortex tube 3.

According to the invention, the regulating system 1 comprises a recovery duct 5 which is suited to collect a first portion of the first gas stream at a collection point 5a located downstream of the heat exchanger 4 and to convey said first portion to the inlet 3a of the vortex tube 3.

In this way, the vortex tube 3 is fed with the hot gas collected at the outlet of the heat exchanger 4, instead of the colder gas collected at the inlet of the heat exchanger 4, as is the case when the known technique described above is used.

Consequently, the heating effect of the vortex tube 3 is more effective compared to known technique and, therefore, the gas that flows out of the heat exchanger 4 is correspondingly warmer, thus achieving one of the objects of the invention.

Preferably, the collection point 5a from which the first gas portion is collected is located downstream of the regulating device 2, with the advantage of conveying to the regulating device 2 the entire gas stream that has been pre-heated in the heat exchanger 4, in such a way as to maximize the heating effect.

Figure 2:
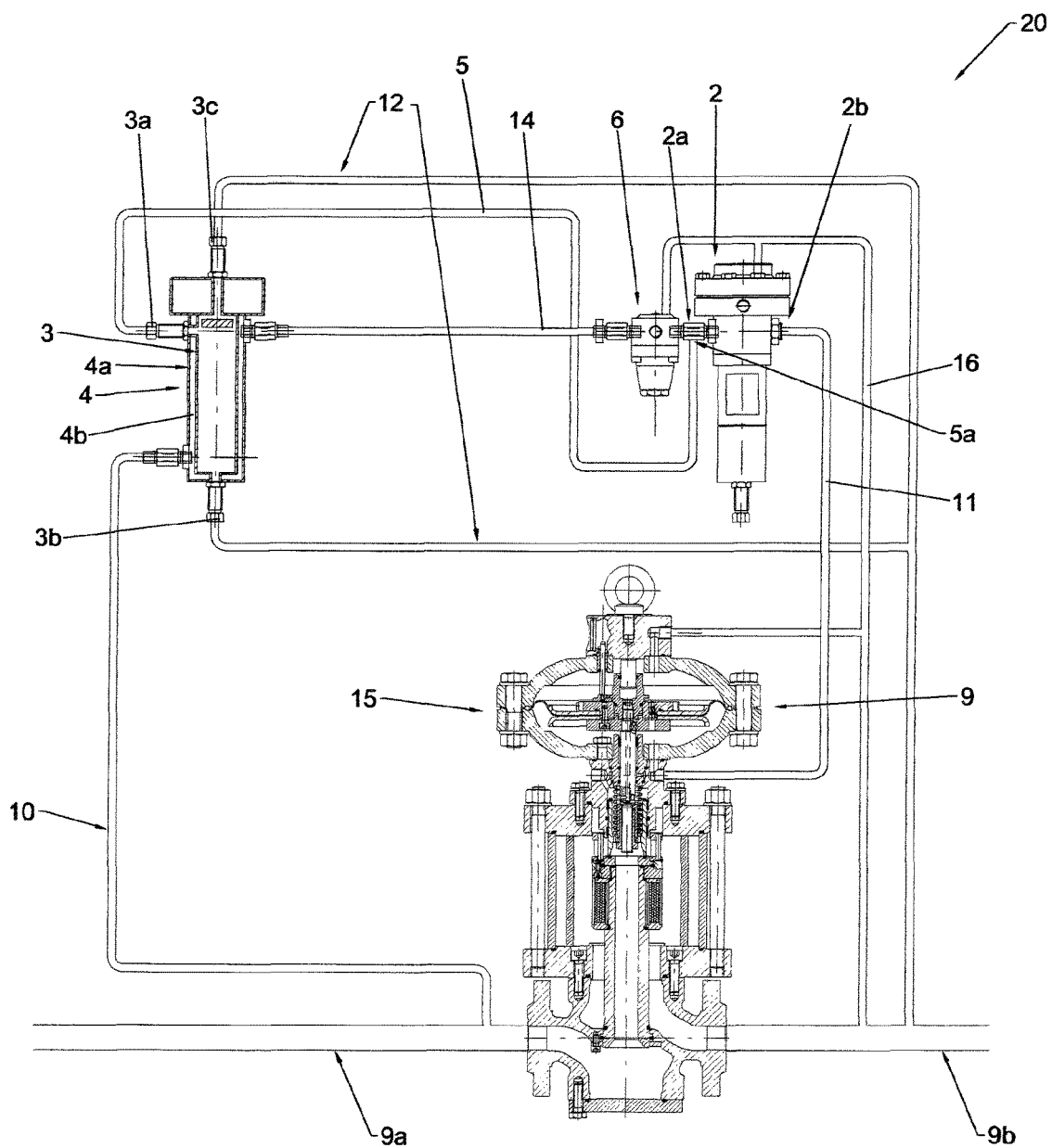
FIGS. 2 to 5 show each a schematic view of a variant embodiment of the regulating system illustrated in FIG. 1.

Another variant embodiment of the invention, indicated as a whole by 20 in FIG. 2, differs from the one previously described in that the collection point 5a from which the first gas portion is collected is located upstream of the regulating device 2 along the connection duct 14.

The variant embodiment just described above offers the advantage that the pressure of the gas feeding the vortex tube 3 is higher than in the first embodiment, thus making it possible to increase the effectiveness of the vortex tube 3.

Preferably but not necessarily, both of the embodiments described above comprise a first pressure reducer 6 arranged between the heat exchanger 4 and the regulating device 2 along the connection duct 14, said pressure reducer being suited to reduce the pressure of the first gas stream to the value required by the regulating device 2.

In the case of the variant embodiment described above, the collection point 5a is located downstream of said first pressure reducer 6.

Figure 3:
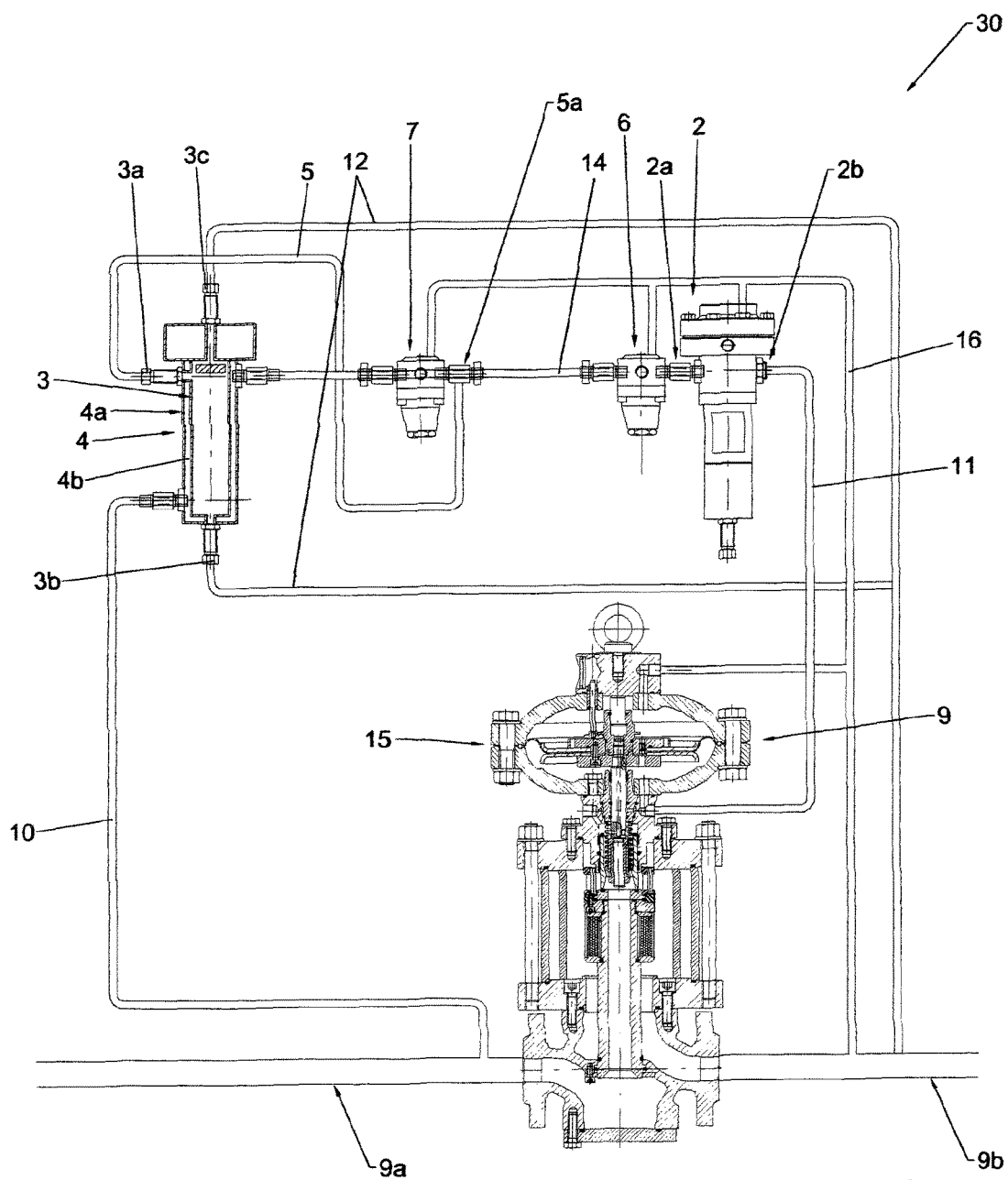

According to a further variant embodiment of the invention, illustrated in FIG. 3, the regulating system therein indicated as a whole by 30 differs from the one of the previous embodiment as it comprises a second pressure reducer 7 interposed between the heat exchanger 4 and the first pressure reducer 6, said second pressure reducer being suited to reduce the pressure of the first gas stream.

In said second variant, the collection point 5a of the first gas portion is located between the two pressure reducers 6 and 7.

Advantageously, the presence of the second pressure reducer 7 makes it possible to feed the vortex tube 3 with a gas at a higher pressure than required by the regulating device 2, with the advantage of increasing the effectiveness of the vortex tube 3.

It is evident that the decision to opt for the first embodiment or for one of the two variant embodiments described above depends on the optimal feeding pressure of the vortex tube 3 in relation to the specific system used.

Figure 4:
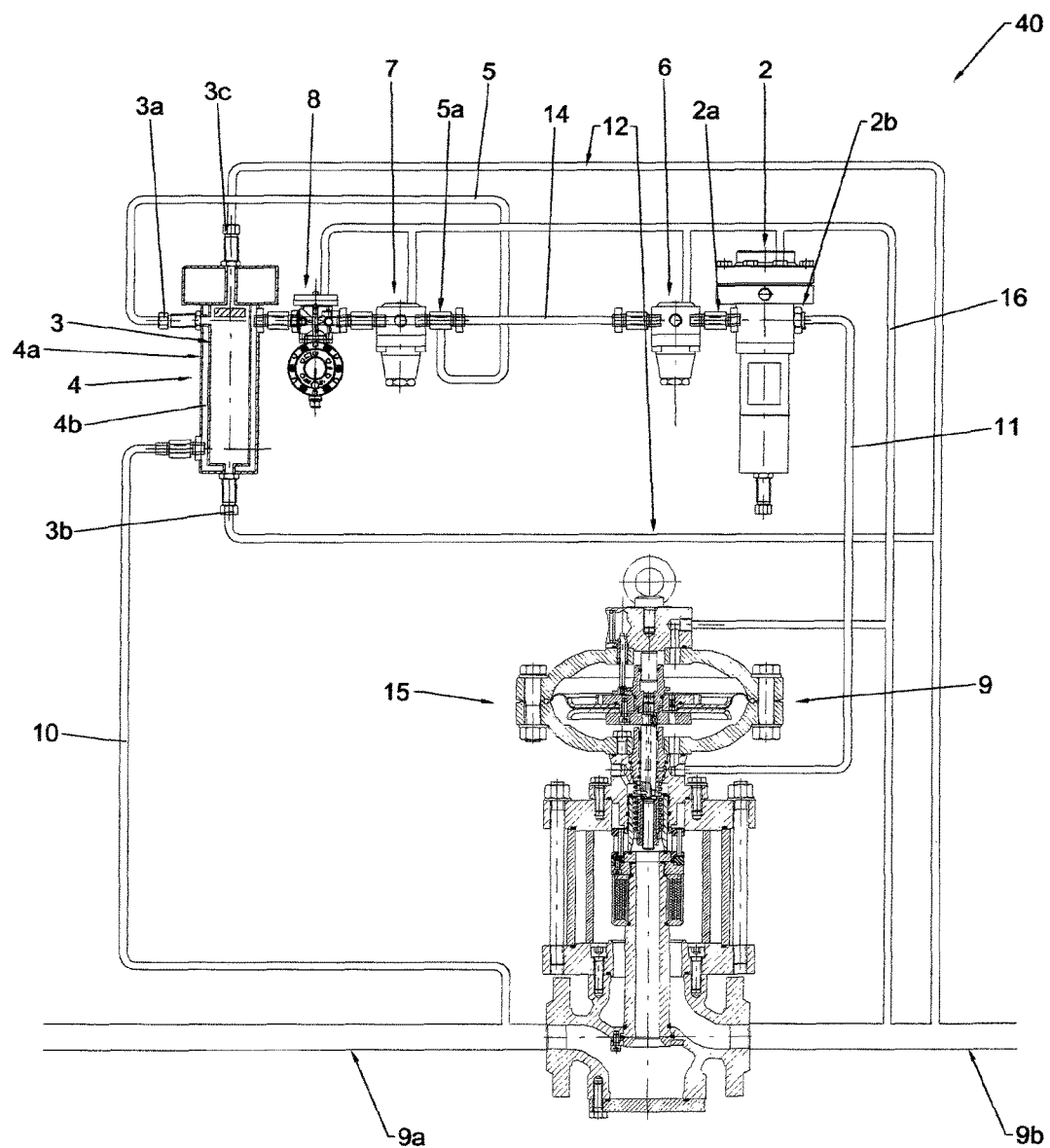

A further variant embodiment of the invention, illustrated in FIG. 4 where it is indicated as a whole by 40, differs from the regulating system 30 according to the previous embodiment due to the presence of a safety valve 8 arranged between the heat exchanger 4 and the collection point 5a along the connection duct 14, said safety valve being suited to interrupt the first gas stream.

Said safety valve 8 makes it possible to interrupt the flow of gas through the heat exchanger 4 and, therefore, also the flow of gas through the vortex tube 3, which is also fed by the gas that flows out of the heat exchanger 4.

As said safety valve 8 is fed by the hot gas that flows out of the heat exchanger 4, the formation of ice and the consequent blockage of the safety valve 8 itself are thus advantageously prevented.

The object to increase the safety of the regulating system 40 compared to a regulating system carried out according to the known technique described above is thus achieved.

It can be understood that said safety valve 8 can be applied with the same advantages to any one of the embodiments of the regulating system 1, 20 and 30 described above.

According to another aspect of the invention, the gas flowing out of the regulating device 2 is preferably used to control a pressure regulator 9 which is represented in cross section in the figures and is suited to maintain the pressure of a second gas stream at a predefined set value.

As shown in Figures from 1 to 4, said second gas stream flows into the pressure regulator 9 through an inlet duct 9a at a supply pressure that exceeds said preset value and flows out of said pressure regulator 9 through an outlet duct 9b at a pressure corresponding to said preset value.

In particular, said pressure regulator 9 comprises control means 15 which are sensitive to the pressure of the first gas stream flowing out of the regulating device 2 and preferably comprise a membrane on which the regulated pressure acts.

In this way, the pressure regulator 9 and the regulating device 2 together define a regulating unit suited to regulate the pressure of the second gas stream.

Preferably, the first gas stream is collected from the inlet duct 9a of the pressure regulator 9 and conveyed to the heat exchanger 4 through a duct 10. Furthermore, preferably, the portion of the first gas stream that remains after the collection of the first portion downstream of the heat exchanger 4 is conveyed to said control means 15 of the pressure regulator 9 through a duct 11.

Still preferably, the regulating system 1, 20, 30, 40 comprises means 12 suited to convey the hot portion and the cold portion of the gas that flow out of the vortex tube 3 to the outlet duct 9b of the pressure regulator 9.

Figure 5:
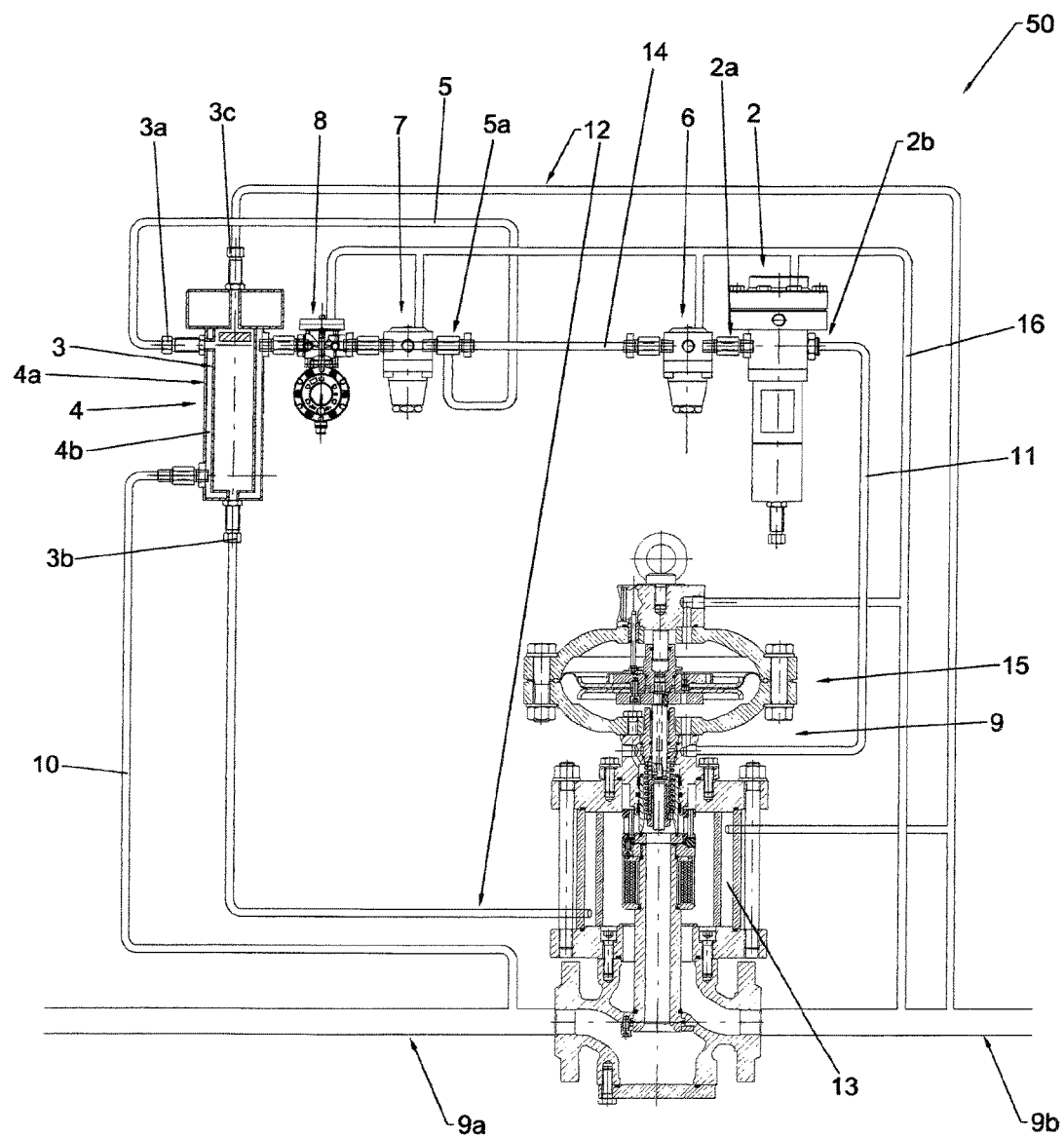

According to a variant embodiment of the regulating system of the invention, represented in FIG. 5 where it is indicated as a whole by 50, said means suited to convey the hot portion and the cold portion comprise heat exchange means 13 which allow heat to be exchanged between said hot portion and the pressure regulator 9.

Advantageously, said heat exchange means 13 prevent the formation of ice in the pressure regulator 9 and, consequently, ensure the smooth operation of the regulator itself.

Preferably, said heat exchange means 13 comprise a duct that places the hot portion of the gas flowing out of the vortex tube 3 in thermal contact with the body of the pressure regulator 9.

Obviously, said heat exchange means 13 can be applied to a regulating system according to any of the embodiments 1, 20, 30, 40 previously described.

A further aspect of the invention comprises a method for regulating the pressure of a gas stream, according to which the gas stream is heated through a heat exchange with a vortex tube 3, in such a way as to obtain a heated gas stream.

The method includes the further operation of conveying the heated gas stream into a pressure regulating device 2 in order to maintain its pressure at a predefined set value.

According to the invention, the vortex tube 3 is fed with a portion of said heated gas stream.

According to the above, it can be understood that the regulating system and the regulating method described above achieve all the objects of the invention. In particular, the fact that the vortex tube is fed with a portion of gas that has been heated in the heat exchanger makes it possible to increase the heating effectiveness of the vortex tube itself, thus increasing the reliability of the regulating system and allowing the latter to be used in more demanding conditions compared to the known technique.

The configuration described above, furthermore, makes it possible to use a single safety valve to interrupt the gas flow through the heat exchanger and the vortex tube, wherein said safety valve is also heated by the gas flow, consequently increasing the safety of the regulating system compared to the known technique.

The invention claimed is:

1. A pressure regulating system suited to regulate the pressure of a gas, comprising:
   a regulating device suited to regulate the pressure of a first gas stream, provided with an inlet for the gas at a supply pressure and with an outlet for the gas at a regulated pressure lower than said supply pressure;
   a vortex tube configured in such a way that it receives a gas stream through an inlet, separates it into a hot portion and a cold portion and delivers said hot and cold portions through corresponding outlets;
   a heat exchanger coupled with said vortex tube in order to heat said first gas stream before it flows into said regulating device; and
   a recovery duct suited to collect a first portion of said first gas stream at a collection point located downstream of said heat exchanger and to convey it to said inlet of said vortex tube.

2. The regulating system according to claim 1, wherein said collection point is located downstream of said regulating device.

3. The regulating system according to claim 1, wherein said collection point is located upstream of said regulating device.

4. The regulating system according to claim 3, further comprising a pressure reducer interposed between said heat exchanger and said regulating device, in order to reduce the pressure of said first gas stream, said collection point being located downstream of said pressure reducer.

5. The regulating system according to claim 1, further comprising two pressure reducers interposed between said heat exchanger and said regulating device, each suited to reduce the pressure of said first gas stream, said collection point being located between said two pressure reducers.

6. The regulating system according to claim 1, further comprising a safety valve interposed between said heat exchanger and said collection point and suited to interrupt said first gas stream.

7. The regulating system according to claim 1, further comprising a pressure regulator connected to an inlet duct for a second gas stream at a second supply pressure and to an outlet duct for said second gas stream at a pressure equal to a predefined set value lower than said supply pressure, said pressure regulator being controlled by said first gas stream flowing out of said regulating device.

8. The regulating system according to claim 7, further comprising means suited to convey said first gas stream from said inlet duct to said heat exchanger.

9. The regulating system according to claim 8, wherein said pressure regulator comprises control means which are sensitive to the pressure of said first gas stream flowing out of said regulating device, means being provided which are suited to convey the portion of said first gas stream remaining once said first portion has been collected to said control means.

10. The regulating system according to claim 7, further comprising means suited to convey said hot portion and said cold portion flowing out of said vortex tube to said outlet duct.

11. The regulating system according to claim 10, wherein said means for conveying said hot portion and said cold portion comprise heat exchange means which allow heat to be exchanged between said hot portion and said pressure regulator.

12. The regulating system according to claim 1, wherein said heat exchanger comprises a jacket containing said vortex tube, in such a way as to delimit a hollow space around said vortex tube for the passage of said first gas stream.

13. A method for regulating the pressure of a gas stream, comprising the following operations:
   subjecting said gas stream to heat exchange using a vortex tube in such a way as to obtain a heated gas stream;
   regulating the pressure of said heated gas stream in a pressure regulating device;

feeding said vortex tube with a portion of said heated gas stream.

* * * * *